United States Patent [19]

Scanlan

[11] Patent Number: 5,237,791
[45] Date of Patent: Aug. 24, 1993

[54] MODULAR STRUCTURES AND COMPONENTS THEREOF

[76] Inventor: James E. Scanlan, 103 Jackson Ave., Bradford, Pa. 16701

[21] Appl. No.: 778,310

[22] Filed: Oct. 16, 1991

[51] Int. Cl.$^5$ .............................................. E04B 5/00
[52] U.S. Cl. .................................. 52/655.1; 403/252; 211/192
[58] Field of Search ................ 52/282, 239, 240, 243, 52/238.1, 36, 484, 764, 765, 769; 403/252, 254, 264; 211/192

[56] References Cited

U.S. PATENT DOCUMENTS

| | | | |
|---|---|---|---|
| 3,180,446 | 4/1975 | Wenger . | |
| 3,871,153 | 3/1975 | Birum, Jr. . | |
| 3,915,579 | 10/1975 | Offenbroich | 403/264 |
| 3,927,498 | 12/1975 | Benedetti . | |
| 4,133,433 | 1/1979 | Wolf | 211/192 |
| 4,570,390 | 2/1986 | Wendt . | |
| 4,586,843 | 5/1986 | Heng et al. | 403/252 |
| 4,632,473 | 12/1986 | Smith | 403/252 |
| 4,638,606 | 1/1987 | Wendt . | |
| 4,787,769 | 11/1988 | Michael | 403/252 |
| 5,052,565 | 10/1991 | Zachrei | 403/254 X |

OTHER PUBLICATIONS

"The Rental System With the Custom Look", Expotechnik USA Inc.
*TradeShow & Exhibit Manager*, "General Electrical Systems", Pomper, John, Aug./Sep. 1991, pp. 16-19.

*Primary Examiner*—Carl D. Friedman
*Assistant Examiner*—Creighton Smith
*Attorney, Agent, or Firm*—Hodgson Russ Andrews Woods & Goodyear

[57] ABSTRACT

A connector for attaching a beam of a modular structure to either a post or another beam whereby the number of different types of parts in inventory may be reduced. Tabs on an edge of the connecter engage longitudinal grooves formed in a beam surface and are laterally located. The tabs alternatively engage slots sized to a tab width in a wall of a post for precise attachment thereto. A pin is spring biased to protrude from the edge outwardly to engage an aperture in the beam or post to prevent upward movement of and thereby lock the connector thereto whereby the connector may be attached quickly and easily and without inadvertently causing already attached connectors to be disengaged from other walls of a post. A decorative kingpost flange cover is provided which has a hollow interior and an opening thereto for receiving the flange which is held in position by a pair of internal tabs which are flexibly biased to engage grooves in the flange walls whereby two such covers may engage each other along engagement lines less noticeably near the kingpost center for a more aesthetically pleasing appearance and whereby a slot in the cover may be provided to securely attach a wall member directly to the kingpost.

15 Claims, 5 Drawing Sheets

MODULAR STRUCTURES AND COMPONENTS THEREOF

The present application relates generally to modular structures such as may be used, for example, for trade shows. More particularly, the present invention relates to connectors for the posts and beams or such structures and to decorative covers for kingposts thereof.

Examples of various building constructions are included in U.S. Pat. Nos. 4,638,606 and 4,570,390 to Wendt, U.S. Pat. No. 3,927,498 to Benedetti, U.S. Pat. No. 3,871,153 to Birum, Jr., and U.S. Pat. No. 3,180,446 to Wenger.

Trade shows, such as the GE Medical Systems trade show shown on the cover of the August/September, 1991, issue of "Trade Show & Exhibit Manager", may temporarily require a booth size as much as 22,000 sq. ft. in a 2-story configuration yet require a set-up time of perhaps only four or five days. See the article "General Electric Medical Systems" by J. Pomper at pages 16 to 19 of the aforesaid magazine. In order to provide such rapid deployment and take-down of such large structures, more than 8,000 parts may be provided in a modular construction. By the term "modular" is meant that the structure is planned or constructed on the basis of a standard pattern or standard dimensions so that it is capable of being easily joined to or arranged with other parts or units.

Components for such a modular structure include posts, beams, and connectors for connecting the beams to each other and to the posts. To this structural framework are added panels and the like to form the walls and ceiling.

Figures 1, 2, 3:
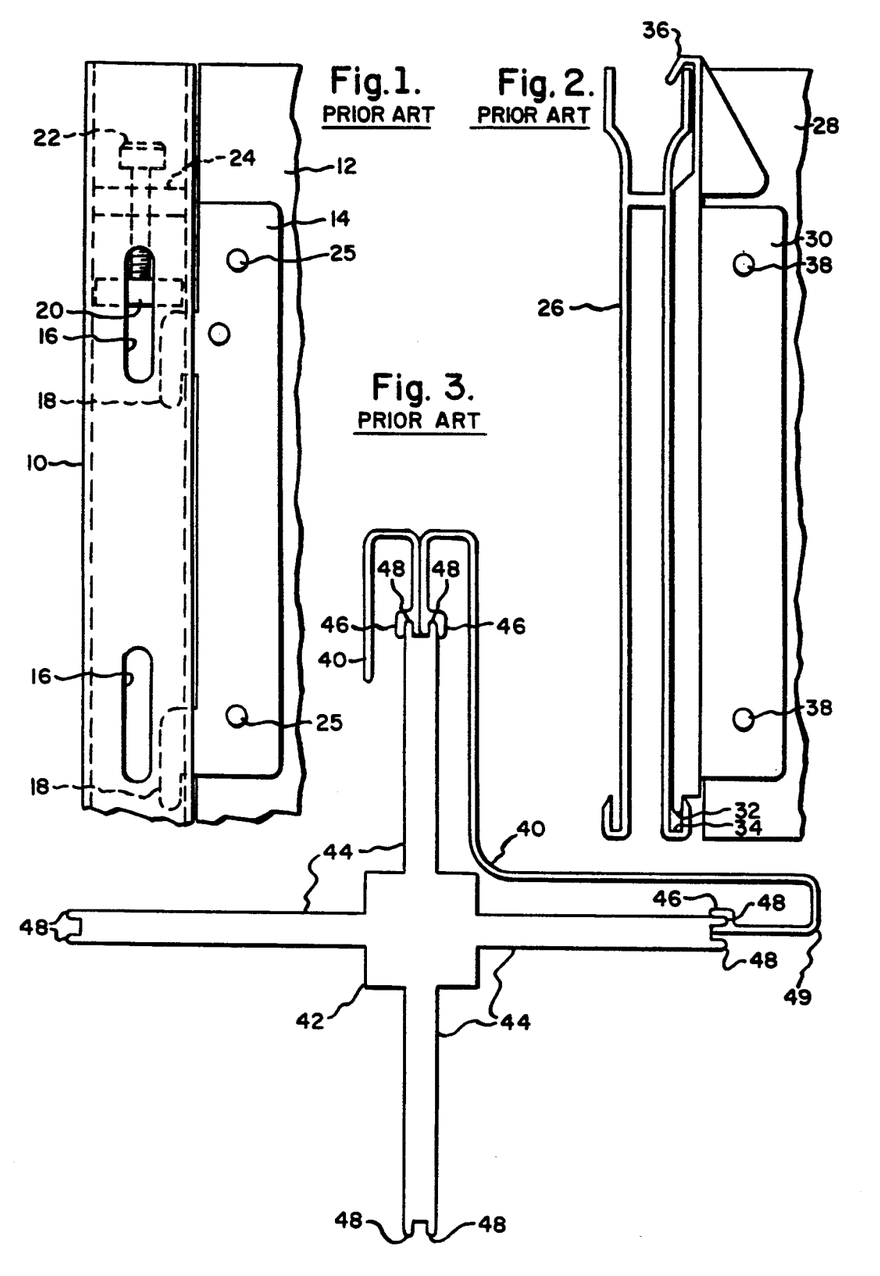
FIG. 1 is a partial side view illustrating the connection of a beam to a post in accordance with the prior art.
FIG. 2 is a partial side view illustrating the connection of a pair of beams in accordance with the prior art.
FIG. 3 is a top view illustrating the attachment of a cover member to a kingpost in accordance with the prior art.

Components which have been provided for such modular structures are illustrated in FIGS. 1 to 3. FIG. 1 illustrates the connection of a post 10 to a beam 12 by means of a connector 14. The post 10 is of a hollow construction having a square cross section with a pair of vertically spaced slots 16 in each of its four faces for receiving tabs 18 of the connector 14. The tabs 18 are held in the slots 16 by means of flange 20 which is screwed up and down within the hollow interior of the post 10 by means of a set screw illustrated at 22 mounted to support 24 which extends across the interior of the post and is attached to the walls thereof. As seen in FIG. 1, when the flange 20 is screwed down by manipulating the setscrew 22 to engage the upper surface of the upper one of the tabs 18 they are prevented from upward movement so that the connector 14 is securely held attached to the post 10. In order to remove the connector from the post, the set screw 22 is manipulated to raise the flange 20 whereby upward movement of the connector 14 relative to the post 10 is allowed for disengagement of the tabs 18 from the slots 16. The connector 14 is connected to the beam 12 by means of set pins 25 which are inserted through the body portion of the connector and in corresponding apertures in the beam.

A pair of beams 26 and 28 have been connected, as shown in FIG. 2, by means of connector 30. Connector 30 has a bottom tab portion 32 which engages a slot 34 in beam 26. The connector 30 also has an upper portion 36 defining a groove which engages an upper edge of the beam 26 for securing the connector 30 thereto. The connector 30 is secured to the second beam 28 by means of pins 38 which pass through apertures in the body portion of the connector 30 and corresponding apertures in the beam 28. Thus, the beams 26 and 28 are attached to form a corner, i.e., the end of beam 28 extends at a right angle to beam 26. Although beam 28 as well as beam 12 have a pair of walls, similarly as shown for beam 26, only the walls thereof passing in back of the connectors 30 and 12 respectively are shown, the walls passing in front of the respective connectors not being shown for purposes of clarity.

While the connector 14 performs well in connecting a beam to a post, it nevertheless disadvantageously requires that the flange 20 be manipulated each time it is desired to add a connector to one of the four walls of the post or to remove a connector therefrom. The use of a wrench to manipulate the flange consumes valuable time. Moreover, the manipulation of the flange 20 to remove one of two or more connectors attached to the post or to attach a connector may result in any already assembled connectors inadvertently becoming detached therefrom with a result that valuable time may be lost in providing the necessary reassembly as well as the possibility of injury. It is therefore desirable to provide a connector for securely attaching a beam to a post quickly and easily and without the possibility of inadvertent detachment of already assembled beams from other walls of the post.

Furthermore, the structures illustrated in FIGS. 1 and 2 require two separate kinds of connectors, one to attach a beam to a post, as illustrated in FIG. 1, and another to attach two beams, as illustrated in FIG. 2. When an excess of 8,000 parts are required to construct a modular structure within a short period of time, additional types of parts add to the complexity of the project and the time required. It is thus desirable to provide a connector which can connect both posts to beams and beams to beams so as to reduce the number of different types of parts in order to simplify inventory and increase the speed of construction.

FIG. 3 illustrates a decorative cover 40 which has been applied to kingpost 42. Up to four covers 40 may be applied, each cover covering a surface of one of the projections 44 and the adjacent surface of an adjacent projection. Thus, the cover 40 has a pair of walls which are perpendicular to each other and extend outwardly beyond the respective projections and are doubled back to end portions 46 which are slotted to engage projecting portions 48 on the ends of the projections. The cover 40 is made out of a flexible material which allows it to be flexed to engage the projecting portions 48.

Since covers 40 have a pair of walls which extend at right angles to each other, they take up a lot of space during storage and transportation. Since modular structures for trade shows and the like involve a constant process of building, tearing down, and transportation to new sites, it is desirable that the components be as compact as possible for storage and transportation.

The spreading of covers 40 from an angle of 90° or less to an angle greater than 90° over a length of perhaps 2.8 meters for attachment is difficult and time consuming.

The attachment of a wall to the cover 40 rather than to the kingpost flange results in a less secure attachment, and the attachment of a wall to a single cover undesirably requires an offset. If the wall is to be detached, the cover must be replaced thereby undesirably requiring two types of covers to be carried in inventory.

Moreover, the covers 40 engage each other along lines, as at 49, which are in highly visible locations exteriorly of the kingpost. It would be desirable to eliminate these locations for these lines in favor of locations therefor which are less visible to the public so that a more aesthetically pleasing kingpost cover may be provided.

It is accordingly an object of the present invention to provide a connector for attaching a beam to a post or to another beam whereby the number of types of components in inventory may be reduced.

It is another object of the present invention to provide such a connector which is securely yet easily and quickly assembled to the post or other beam.

It is a further object of the present invention to provide such a connector which is easily assembled to a post without already assembled connectors becoming inadvertently disconnected therefrom.

It is yet another object of the present invention to provide kingpost covers which are compact and easily and quickly assembled to a kingpost.

It is yet another object of the present invention to provide such covers which are assembled to the kingpost such that unsightly cover engagement lines at highly visible locations exteriorly of the kingpost are eliminated so as to provide a more aesthetically pleasing appearance.

It is still another object of the present invention to provide such a cover which is assembled to the kingpost flange so that a wall may also be attached to the kingpost flange for secure attachment of the wall to the kingpost.

In order to provide quick and easy yet secure attachment of a beam to a post or to another beam, in accordance with the present invention a connector is provided which is provided with vertically spaced tabs along its edge to engage slots in either a post of a beam, and the connector is prevented from movement to a position relative to the post or beam which would cause disengagement of the tabs from the slots by a pin in the connector which is spring-biased to extend from the connector to engage an aperture in the post or beam. Thus, the fumbling and time required for manipulating a set screw may be eliminated along with the possibility of inadvertent disengagement of already attached connectors. In order to provide aesthetically pleasing and compact covers for a kingpost, in accordance with the present invention a cover is provided which covers both sides of a kingpost projection and has an opening thereinto for receiving the projection with a pair of tab means on the interior surfaces of the sidewalls thereof which are flexibly biased to removably engage groove means on the projection sides.

The above and other objects, features, and advantages of the present invention will be apparent in the following detailed description of the preferred embodiments thereof taken in conjunction with the accompanying drawings wherein like reference numerals denote like or similar components throughout the several views.

DETAILED DESCRIPTION OF THE PREFERRED EMBODIMENTS

Figure 4:
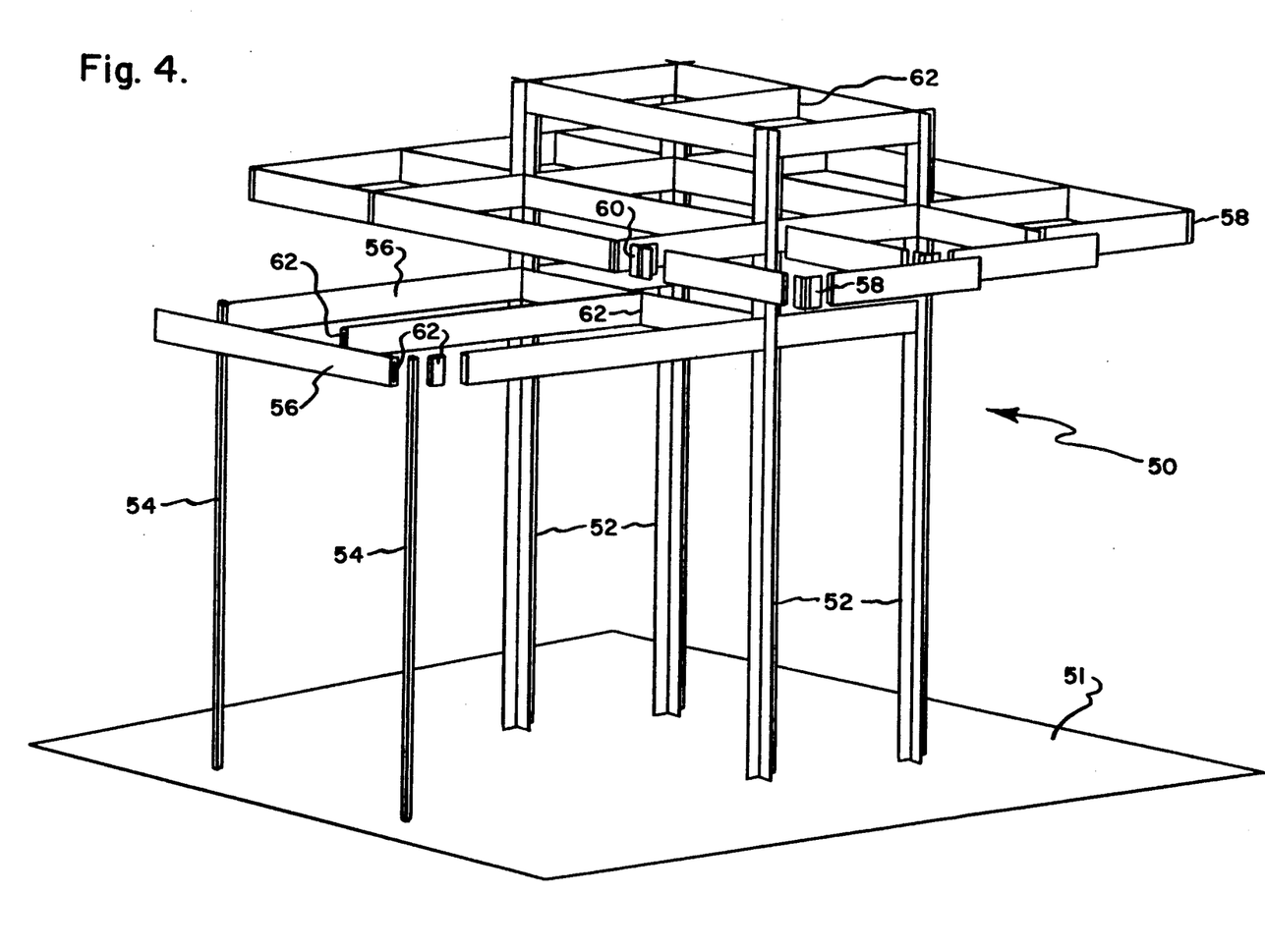
FIG. 4 is a perspective view with some portions broken away from each other illustrating part of a modular structure which embodies the present invention.

Referring to FIG. 4, there is shown generally at 50 a modular structure which may, for example, be erected in a convention center for a trade show or the like. The structure 50 is shown standing on a floor 51 and is composed of a number of components which may be fitted together on site, torn down after the show, and put back together at another location These components include vertical kingposts 52 and posts 54 and also include beams 56 which extend horizontally between other beams and posts. "L" connectors, illustrated at 58, connect the end of one beam to the end of another. "T" connectors, illustrated at 60, connect the ends of three beams together.

Except as described herein, the various components of the structure 50 are attached together using principles commonly known to those of ordinary skill in the art to which this invention pertains.

Fasteners used for connecting various parts of the structure 50 may be composed of a nickel stainless steel alloy or other suitable material. The beams and posts may be composed of aluminum or other suitable material. The posts may be supported on a floor by means of a base and leveler attachment as commonly known in the art.

Beam connectors, illustrated at 62, connect the ends of beams 56 to posts 54 or to other beams 56 along the length thereof, as will be discussed in greater detail hereinafter. Since a beam connector 62 of the present invention can be used to attach the ends of beams 56 to either posts 54 or other beams 56, it is unnecessary in accordance with the present invention to supply in inventory two different types of connectors for these two different tasks thus simplifying the inventory requirements for more rapid erection of the structure 50.

Figures 5, 6, 8:
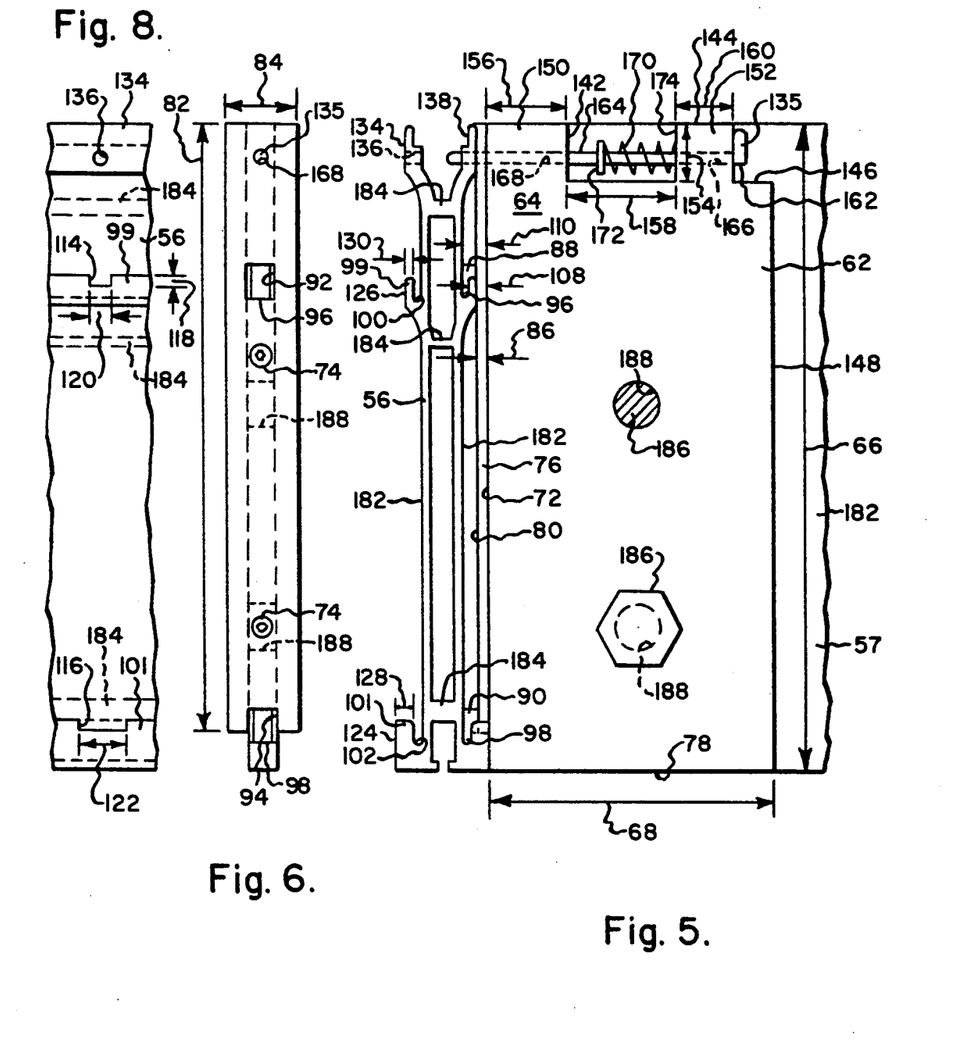
FIG. 5 is a front view of a connector of FIG. 4 illustrating the connection of two beams therewith in accordance with the present invention.
FIG. 6 is a side view of the connector of FIG. 5.
FIG. 8 is a partial side view of a beam of FIG. 5 showing a surface portion for engagement by a side edge of the connector of FIG. 5 for attachment thereto.
Figure 7:
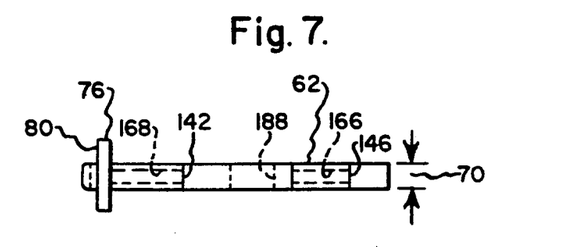
FIG. 7 is a top view of the connector of FIG. 5.
Figures 9, 12:
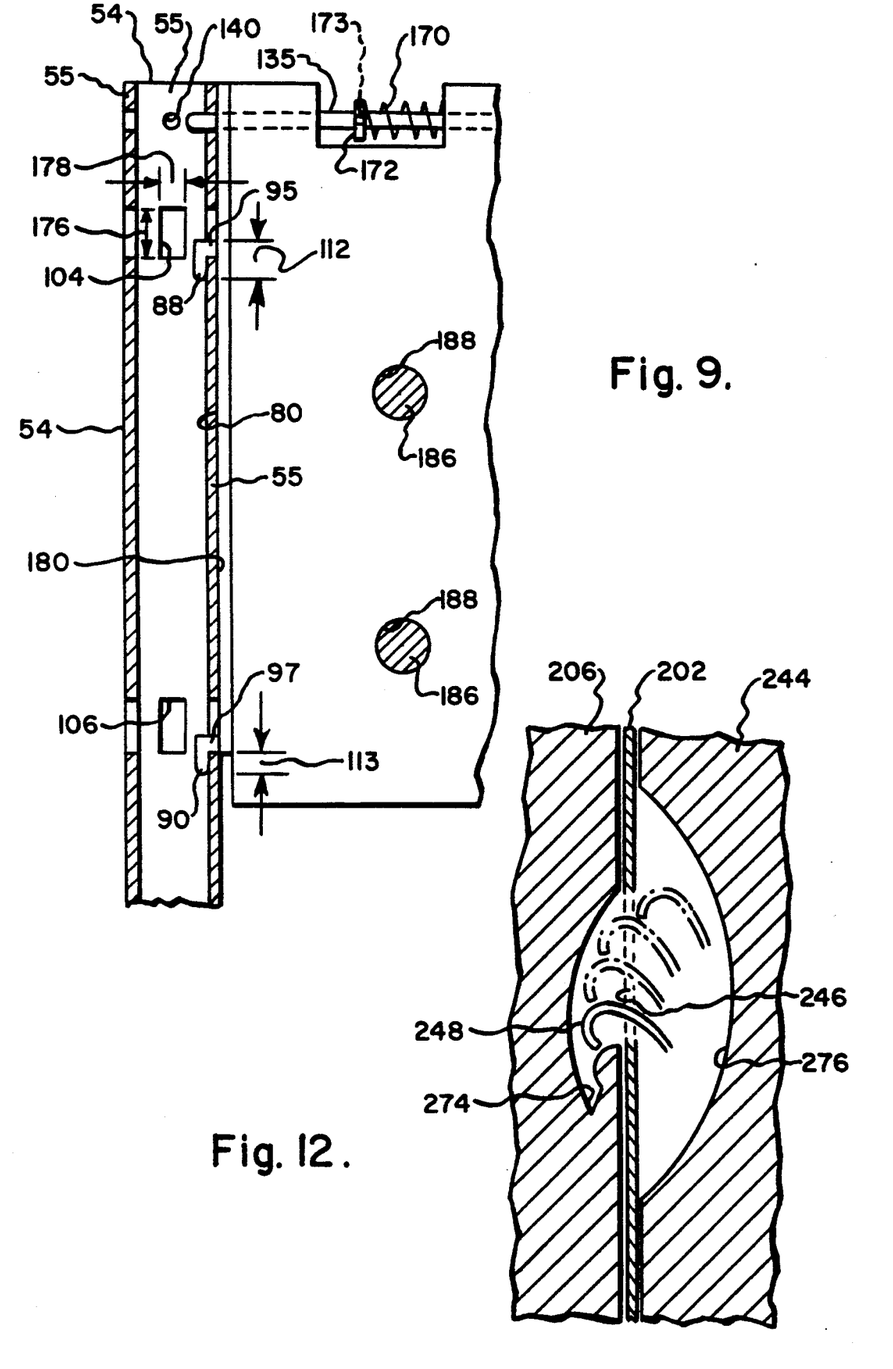
FIG. 9 is a view similar to that of FIG. 5 illustrating the attachment of the connector of FIG. 5 to a post, which is shown in section.
FIG. 12 is a schematic view illustrating the attachment of the wall to the kingpost of FIG. 10.

Referring to FIGS. 5, 6 and 7, the beam connector 62 comprises a generally rectangular piece of steel 64 or other suitable material such as plastic which may have a length, illustrated at 66, of perhaps about 170 mm., a width, illustrated at 68, of perhaps about 76 mm., and a thickness, illustrated at 70, of perhaps about 5 mm. Unless otherwise specified herein, all exemplary dimensions provided herein are understood to be with respect to the same example. It should also be understood that such dimensions are given herein for exemplary purposes only and not for purposes of limitation. The beam width is less at the top than at the bottom to allow placement of a decorative cover thereon. Attached to a longitudinal edge 72 by means of set screws 74 or other suitable means is a cross piece 76 which extends over the length of the edge 72 and terminates short of the bottom edge 78 of piece 64 to provide an increased width surface 80, as best shown in FIG. 7, for engaging beam 56 or, as shown in FIG. 9, post 54. Cross piece 76 may, for example, have a length illustrated at 82, of perhaps about 163 mm. thereby terminating a distance from bottom edge 78 of perhaps about 7 mm., a width, illustrated at 84, of perhaps about 19 mm., and a thickness, illustrated at 86, of perhaps about 3 mm. If desired, cross piece 76 may be formed integrally with piece 64 or otherwise suitably attached thereto.

A pair of tabs 88 and 90, longitudinally spaced over the length of the edge 72, are formed preferably integrally with piece 64 to project outwardly from edge 72 through a corresponding aperture 92 or slot 94 respectively in cross member 76 and terminate outwardly of cross member 76. Downwardly projecting portions 96 and 98 of tabs 88 and 90 respectively engage respective longitudinally extending slots 100 and 102 defined by upwardly projecting portions of the beam 56 for attachment thereto. As seen in FIG. 9, the tabs 88 and 90 may alternatively engage slots 104 and 106 respectively which extend through a wall 55 of the post 54, which is a hollow member with four such walls 55. The tabs 88 and 90 may, for example, each extend outwardly to the respective projection 96 and 98 a distance, illustrated at 108, which is perhaps 5 mm. thus extending beyond the cross piece 76 a distance of perhaps 2 mm. and may extend outwardly an overall distance, illustrated at 110, of perhaps about 7 mm. Each of the tabs 88 and 90 may, for example, have a height, illustrated at 112 in FIG. 9, of perhaps about 6 mm. with the projections 96 and 98 respectively extending downwardly from the horizontal tab portion 95 and 97 respectively a distance, illustrated at 113 in FIG. 9, of perhaps about 3 mm. The width of each of the tabs 88 and 90 is generally equal to the thickness 70 of piece 64. The bottom surface of the horizontal tab portion 97 of the lower tab 90 is generally even or flush with the bottom edge of the cross member 76.

Rapid and easy erection of modular structure 50 requires that the connectors 62 be precisely locatable laterally at their predetermined locations. Referring to FIG. 8, in order to precisely laterally locate the connector along the length of beam 56, i.e., to locate the connector on the correct center lines so as to maintain the modularity of the system, slots 114 and 116 are formed in the upper edges of the projections 99 and 101 respectively which form the longitudinal grooves 100 and 102 respectively in the beam 56. These slots 114 and 116, which may have a depth, illustrated at 118, of perhaps about 3 mm., are sized to have a width for snugly receiving the tabs 88 and 90 so that the connector 62 is precisely located in a desired squared position relative to the beam 56. For example, the width, illustrated at 120, of the top slot 114 may perhaps be about 7 mm. to snugly receive the upper tab 88 having a width of about 7 mm. The lower slot 116 may, for example, have a width, illustrated at 122, of perhaps about 19 mm. to snugly receive the width of about 19 mm. of the cross piece 76 so that when the cross piece 76 is received within the bottom slot 116 the edge 72 of piece 64 will be flush with the outer surface 124 of projection 101 for good seating of the connector 62, the projection 101 being provided with an increased thickness over that of projection 99 for such engagement. The cross member 76 thus terminates at the tab 90 to provide such enhanced seating. Thus, the thickness, illustrated at 128, of projection 101 may, for example, be 5 mm. whereas the thickness, illustrated at 130, of the upper projection 99 may be perhaps 2 mm. to compensate for the thickness 86 of about 3 mm. of the cross portion 76. The cross piece 76 is accordingly flush with the surface 126 of projection 99 and with a surface 134 along the upper edge of the beam 56. Surfaces 126 and 134 are substantially in the same plane or are co-planer so that connector 62 may be positioned precisely to be squared relative to beam 56 with the cross member 76 supported by projection 101.

In order to prevent upward movement of the tabs 88 and 90 out of their respective grooves 100 and 102 and thus inadvertent detachment of the connector 62 from the beam 56 or post 54 to which it is attached, in accordance with the present invention the connector 62 is locked in position against vertical movement relative to the beam 56 or post 54, i.e., movement in a direction longitudinally of the edge 72, by means of a spring loaded pin 135 which is slidably connected in the connector 62 and which is biased to extend outwardly of cross member 76 to engage respectively an aperture 136 in the upper edge portion 138 which contains the surface 134 or an aperture 140 in the respective wall of the post 54.

In order to mount the pin 135, a notch or cut-out, illustrated at 142, is provided in the upper edge 144 of member 64, and a corner notch, illustrated at 146, is provided at the intersection of the upper edge 144 and the edge 148 of the piece 64 which is opposite edge 72. Notches 142 and 146 define a first connector portion 150 between edge 72 and notch 142 and a second connector portion 152 between the notches 142 and 146. Each of the notches 142 and 146 may have a depth, illustrated at 154, of perhaps about 15 mm. Portion 150 may extend for example, over a length, illustrated at 156, of perhaps about 22 mm., notch 142 may extend over a distance, illustrated at 158, of perhaps about 30 mm., and portion 152 may extend over a length, illustrated at 160, of perhaps about 15 mm. Thus, the corner notch 146 may extend over a length of perhaps about 9 mm.

Pin 135 includes a head portion 162 which is locatable within the space of corner notch 146 for manipulation thereof. Pin 135 also has an elongate portion 164 which extends therefrom through apertures 166 and 168 in portions 152 and 150 respectively which are in alignment with aperture 136 in the beam 56 or aperture 140 in post 54 when the connector 62 is suitably positioned relative thereto so that the pin 135 engages the aperture therein for connection of the connector 62 thereto to prevent vertical movement of the connector relative thereto. The pin 135 is biased for engagement with the aperture 136 or 140 by means of a suitable spring 170 which is located in the notch 142 and on the pin portion 164 between a stop member 172 suitably secured to the pin portion 164 for travel therewith and the respective surface 174 of portion 152. The stop member 172 may be secured by fitting to a circumferential groove, illustrated at 173 in FIG. 9, in the pin surface for which the stop member is suitably sized or by other suitable means. Thus, the pin 135 is biased to be received in the corresponding aperture of the beam 56 or post 54 so that the connector 62 does not become inadvertently detached therefrom yet the connector 62 may be quickly and easily detached by outward movement of pinhead 162 against the bias of the spring 170 to remove the pin 135 from the corresponding aperture in the beam 56 or post 54 after which the connector 62 ma be moved upwardly relative to the beam 56 or post 54 for removal of the tabs 88 and 90 from the grooves or slots thereof. The connector 62 is thus provided to be attached to and detached from either a beam or a post quickly and easily and without disturbing any already attached connectors.

Referring to FIG. 9, the slots 104 and 106 are sized to snugly receive the width of the tabs 88 and 90 for precisely positioning the connector 62 in a squared position relative to the post 54. Thus, each of the slots 104 and 106 may have a height, illustrated at 176, of perhaps about 9 mm., and a width, illustrated at 178, of perhaps about 7 mm. With the tabs 88 and 90 engaging the respective slots, the surface 80 of the cross member 76 may be flush with the outer surface 180 of the respective wall of the post 54, and the pin 135 may then be caused to engage aperture 140, as previously discussed, to prevent inadvertent detachment of the connector 62 therefrom.

As seen in FIG. 5, a beam 56 may generally be comprised of a pair of substantially identical walls 182 with connecting members 184 extending therebetween. These connecting members terminate short of the ends thereof so as to permit the beam connector 62 to be sandwiched between the walls 182. FIG. 5 illustrates a portion of one of the walls 182 of a second beam 57, which may be similar to beam 56, which wall engages the back side of the connector 62, it being understood that the other wall, which is not shown for purposes of clarity, would engage the front side of the connector. The connector 62 is attached to the end of the second beam 57 by means of suitable fastening devices such as bolts 186 which pass through apertures 188 in the connector and corresponding apertures (not shown) in the beam 57, the upper bolt being shown in section. Thus, in accordance with the present invention, the connector 62 may be provided to quickly and easily attach the end of a beam to another beam or to a post without affecting any other attachments.

Figures 10, 11:
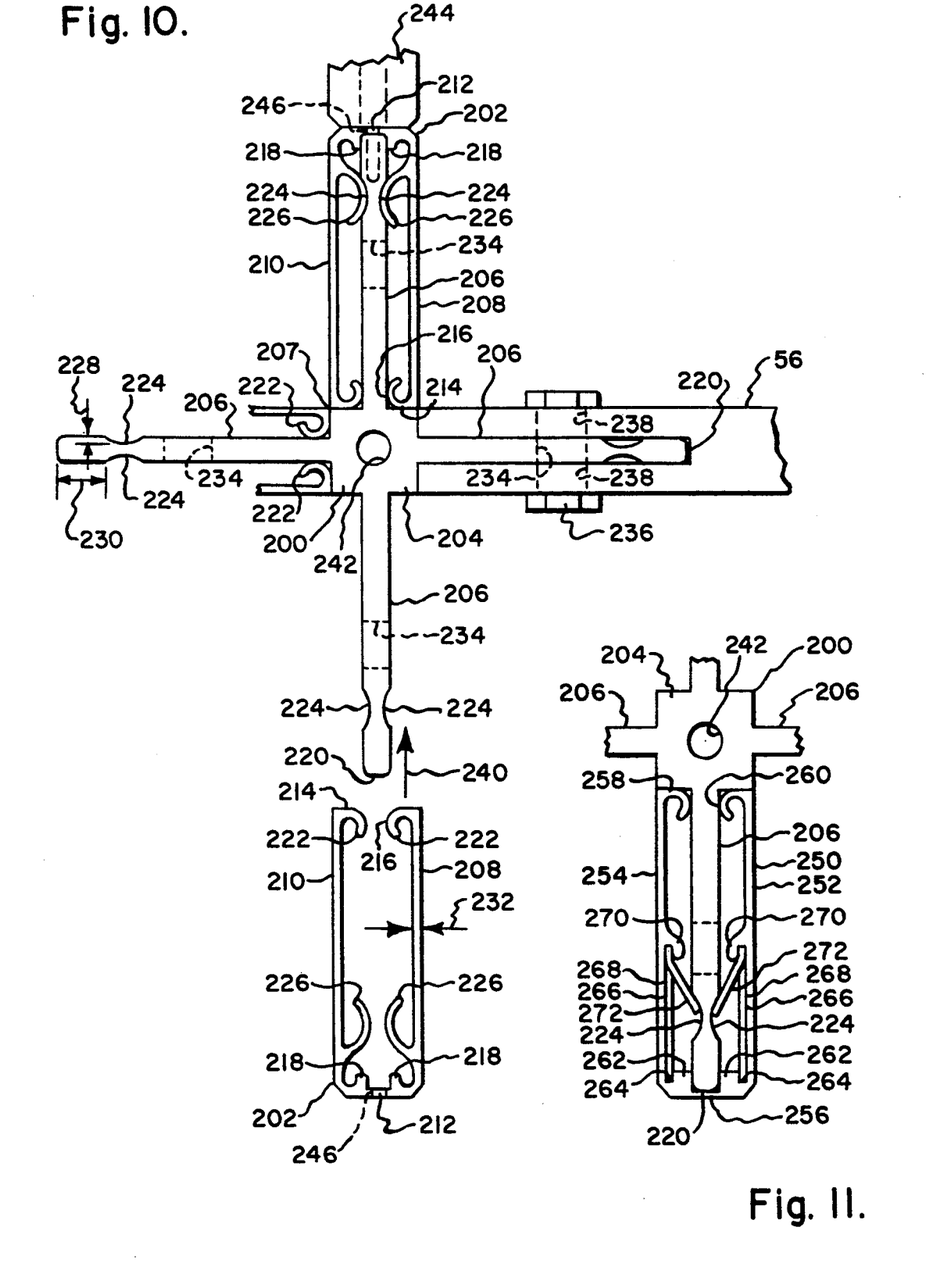
FIG. 10 is a top view of a kingpost with a cover attached to one of the projections thereof, a beam attached to another projection, and another cover in position for attachment to another of the projections in accordance with the present invention.
FIG. 11 is a view similar to FIG. 10 of a kingpost with three projections broken away and illustrating an alternative embodiment of the cover attached to the other projection.

Referring to FIG. 10, there is shown at 200 a kingpost to which is attached a decorative cover 202. The kingpost 200 is composed of a suitable material such as, for example, aluminum, and contains a central elongate vertical portion 204 from which project four projections or flanges 206 over the height thereof. For example, the central portion 204 of the kingpost 200 may have sides of perhaps about 25 mm., and each of the flanges 206 may have a length of perhaps about 76 mm. and a width of perhaps 7 mm. A threaded aperture, illustrated at 242, having a depth of perhaps about 2 inches, is, if desired, provided in the upper surface of the central portion 204 to receive a steel HELI-COIL member provided by Heli-Coil Div., EMHART FASTENINGS SYSTEMS GROUP, DANBURY, Conn., for providing strength for stacking another kingpost on top. A similar threaded aperture (not shown) is provided in the bottom surface of the central portion 204 for receiving a strengthening helicoil for receiving a leveling attachment.

In order to provide a cover for the kingpost flanges 206 which is quickly and easily attachable yet is compact and does not provide an engagement line with another cover outwardly thereof which may detract from its appearance, in accordance with the present invention an individual cover is provided for each of the flanges 206 to thereby leave the engagement line at an inner location, illustrated at 207, inwardly at the inner portion 204 where it may be less noticeable and thus be more aesthetically pleasing.

The cover 202 is a generally hollow structure having a pair of walls 208 and 210, an outer edge wall 212, and an inner edge wall 214. Its length may be equal to the kingpost height or may be equal to the portion thereof which is free of attachment of a beam 56 to the respective flange 206. The inner edge wall 214 is sized to engage and cover the respective surface of the inner portion 204 of the kingpost 200 and has an opening, illustrated at 216, therein sized to receive the flange 206 with the flange extending into the hollow area between the walls 208 and 210 and engaging the inner surface of the end wall 212. A pair of projections 218 from the inner wall are provided to locate the position of the outer edge 220 of the flange 206 and are thus spaced apart to snugly receive the edge 220 of the flange 206. The cover 202 is composed of a suitable flexible material such as, for example, extruded plastic or extruded aluminum, so as to effect bearing of the edges 222 defining the opening 216, which edges are rounded back upon themselves to define tabs, against the flange 206 for a snug fit therebetween, the size of opening 216 being accordingly sized to snugly receive the flange 206.

The tabs 222 are thus flexibly biased to grab the flange 206 so that the engagement of the cover to the kingpost may have an aesthetically pleasing appearance.

A pair of grooves, illustrated at 224, are provided in the opposite sides of each flange 206 to receive correspondingly shaped tabs 226 extending from the inner surfaces of the respective side walls 208 and 210 of the cover 202. The tabs 226 are flexibly biased to engage the respective grooves 224 for securing the cover 202 in position on the kingpost flange 206, the tabs 226 being sufficiently flexible to flex away from each other for insertion and removal of the flange 206. For example, the grooves 224 may each have a depth, illustrated at 228, of perhaps about 1.7 mm. and may be located from the end edge 220 a distance, illustrated at 230, of perhaps about 14 mm. The thickness, illustrated at 232, of the cover walls 208, 210, 212, and 214 as well as the thickness of tabs 222 and 226 may perhaps be generally about 2 mm.

As illustrated at 240, a cover 202 is provided, in accordance with the present invention, for quick and easy attachment to a flange 206 by moving a cover so that the flange passes through the opening 216 then between the tabs 226 which are flexed apart for such passage, and then with the edge seating against the outer edge wall 212 between projections 218. Being flexibly biased, the tabs 226 snap into the grooves 224 to securely attach the cover to the flange 206 so that it is not inadvertently removed therefrom. By application of moderate pulling force, the cover 202 may be easily and quickly removed from the flange 206. Thus, there is provided a cover for a kingpost flange which may be quickly and easily installed for an aesthetically pleasing appearance and quickly and easily detached therefrom.

Apertures 234 are suitably provided through the thickness of the flanges 206 for the purpose of attaching beams 56 thereto by means of bolts 236 or other suitable means which are engaged in apertures 238 in the beams and apertures 234 for attachment of the beam thereto. The flange 206 is sandwiched between the walls of the beam, and the covers 202 are provided along the length of portions of the flanges 206 to which beams are not attached.

The cover 202 also allows a more secure attachment of a wall, illustrated at 244, to the kingpost 200 by allowing it to be connected directly to a kingpost flange 206. Thus, referring to FIG. 12, a slot, illustrated at 246, is provided in the outer wall 212 of the cover and in alignment with a hook-shaped indent 274 in the outer edge of the kingpost flange 206. A camlock mechanism, illustrated schematically at 276, includes a hook 248 wound around an eccentric cam (not shown) embedded in the wall panel 244. In the center of the cam there is a hex opening which, when rotated by means of an allen-type hex key, swings the hook 248, as shown in phantom lines in FIG. 12, through the slot 246 and into indent 274 to lockingly engage the hooked portion thereof so that the wall may be securely attached directly to the kingpost. The slot may, for example, extend over a height of perhaps about 40 mm, and the indent 274, may, for example, extend over a height of perhaps about 56 mm. One such camlock mechanism 276 may be provided suitably along the wall height. The camlock mechanism 276 is a type of connecting device commonly known to those of ordinary skill in the art to which this invention pertains and is therefore not described in further detail herein.

Referring to FIG. 11, there is shown at 250 an alternative embodiment of a kingpost cover which may allow easier manufacture thereof. The cover 250 has side walls 252 and 254 and end walls 256 and 258 and an opening 260 to the hollow interior thereof, which are similar to walls 208, 210, 212, and 214 respectively and the opening 216 for cover 202, for insertion of a kingpost flange 206. Projections 262 from the inner surface of wall 256 are spaced to locate the position of the kingpost projection end edge 220. The projections 262 are also spaced from the respective side walls 252 and 254 to provide grooves 264 for receiving respective edge portions of mounting or support portions 266 of two members 268 mounted to the inner surfaces of the respective walls 252 and 254. Opposite edge portions of the mounting portions 266 are inserted in grooves provided by tabs 270 on the inner surfaces of walls 252 and 254 intermediate the end walls 256 and 258. Thus, the mounting portions 266 are secured to the cover 250 along the inner surfaces of the respective side walls 252 and 254. Members 268 have portions 272 which freely extend into the hollow interior of the cover 250 to engage the respective flange grooves 224. Members 268 are composed of spring steel or other suitable material and flexibly biased to engage the respective flange grooves for securing the cover in position on the flange so that together the members 268 act as a spring. The members 268 flex for the insertion and removal of the flange 206.

As is apparent in FIG. 5, beam 56 is constructed to have a proportionately greater amount of mass at the top and at the bottom along the length thereof, as compared to to prior art beam 26 in FIG. 2, so that the strength to weight ratio of the beam 56 may be optimized.

Thus, in accordance with the present invention improvements are made to the means for connecting beams to posts and to other beams which allow the number of different types of parts in inventory to be reduced and which allow connection quickly and easily and without inadvertent disassembly of already attached components so that trade show exhibits may be erected more quickly and easily. In addition, kingpost covers are provided for quick and easy attachment while providing an aesthetically pleasing appearance.

While the present invention has been described in detail herein, it should be understood that it can be embodied otherwise without departing from the principles thereof, and such other embodiments are meant to come within the scope of the present invention as defined by the appended claims.

What is claimed is:

1. A connector for a modular structure comprising a member having an elongate edge, at least two tabs fixed to said edge and spaced over the length hereof for engaging complementary respective slots in a first structural element for attachment of the connector thereto such that longitudinal movement of said edge relative to the first structural element is required for detaching said connector from the first structural element, a pin, means for spring-biasing said pin in said connector member to protrude outwardly of said edge for engaging an aperture in the first structural element for preventing longitudinal movement of said edge relative to the first structural element when said tabs engage the respective slots for attaching said connector thereto whereby said pin when released is urged by said spring-biasing means to engage the aperture when said tabs engage the respective slots and said pin is aligned with the aperture, said pin being movable to a position for disengagement from the aperture whereby said edge is movable longitudinally relative to the first structural element for detaching the connector from the first structural element, and means for attaching the connector to a second structural element whereby the first and second structural elements are attachable together by the connector.

2. A connector according to claim 1 further comprising means including a cross member for providing a surface area along said edge for engaging the first structural element, said cross member extending along the length of said edge and terminating short of an end of said edge and relative to one of said tabs to define therewith a seating surface for the connector.

3. A connector for a modular structure comprising a member having an elongate edge, at least two tabs fixed to said edge and spaced over the length thereof for engaging complementary respective slots in a first structural element for attachment of the connector thereto such that longitudinal movement of said edge relative to the first structural element is required for detaching said connector from the first structural element, a pin, means for spring-biasing said pin in said connector member to protrude outwardly of said edge for engaging an aperture in the first structural element for preventing longitudinal movement of said edge relative to the first structural element when said tabs engage the respective slots for attaching said connector thereto, said pin being movable to a position for disengagement from the aperture whereby said edge is movable longitudinally relative to the first structural element for detaching the connector from the first structural element, and means for attaching the connector to a second structural element whereby the first and second structural elements are attachable together by the connector, the connector further including another edge on said member, said spring-biasing means comprising means defining a cutout in said another edge flanked by a pair of member portions, aperture means in each of said member portions for receiving said pin in orientation to extend normal to said elongate edge and beyond said elongate edge to engage the first structural member aperture, means defining a handle for said pin for movement thereof for disengagement from the first structural member aperture, a spring disposable within said cutout means and about said pin, and means for fixing one end of said spring to said pin so that the spring is compressed when the pin is moved for disengagement from the first structural member aperture.

4. A connector according to claim 3 further comprising notch means in a corner of said member, said handle means being disposable within the space defined by said notch means.

5. A modular structure comprising a first structural element having a side, a second structural element, and a connecting member having an elongate edge, at least two tab means fixed to said connecting member edge and spaced over the length thereof, at least two slot means on said first structural element side for receiving said tab means respectively such that longitudinal movement of said edge relative to said first structural element side is required for detaching said connecting member from said first structural element, means for laterally locating the position of said connecting member relative to said first structural element, aperture means in said first structural element, a pin, means for spring-biasing said pin in said connecting member to protrude outwardly of said elongate edge for engaging said aperture means for preventing longitudinal movement of said edge relative to said first structural element when said tab means engage said respective slot means for attaching said connecting member thereto whereby said pin when released is urged by said spring-biasing means to engage the aperture means when said tabs engage the respective slots and said pin is aligned with the aperture means, said pin being movable to a position for disengagement from said aperture means whereby said edge is movable longitudinally relative to said first structural element for detaching said connecting member from said first structural element, and means for attaching said connecting member to said second structural element.

6. A modular structure according to claim 5 wherein each of said tab means includes a body portion attached to said elongate edge and a portion depending therefrom generally parallel to said elongate edge, said slot means includes an elongate portion on said first structural element and which defines a slot between said elongate portion and said first structural element side for receiving said tab means depending portion, and said lateral position locating means comprises notch means in said respective slot means elongate portion for receiving said respective tab means body portion.

7. A modular structure according to claim 6 wherein said connecting member has means including a cross member which extends along the length of said elongate edge for providing a surface area for engaging said first structural element, said cross member terminating short of an end of said elongate edge and relative to one of said tab means by portions to define therewith a seating surface for said connecting member, said notch means in said corresponding slot means elongate portion sized to have a width which is greater than the width of the other of said notch means for receiving said cross member.

8. A modular structure according to claim 5 wherein said first structural element comprises a hollow post, said slot means extends through said first structural member side for receiving said tab means.

9. A modular structure according to claim 5 further including another edge on said connecting member, said spring-biasing means comprising means defining a cutout in said another edge flanked by a pair of member portions, aperture means in each of said member portions for receiving said pin in orientation to extend normal to said elongate edge and beyond said elongate edge to engage said first structural element aperture means, means defining a handle for said pin for movement thereof for disengagement from said first structural member aperture means, a spring disposable within the space defined by said cutout means and about said pin, and means for fixing one end of said spring to said pin so that the spring is compressed when the pin is moved for disengagement from the first structural member aperture means.

10. A modular structure according to claim 9 further comprising notch means in a corner of said member, said handle means being disposable within the space defined by said notch means.

11. A modular structure kit comprising at least one post having a side, at least one beam having a side, at least one other structural element, and at least one connecting member having an elongate edge, at least two tab means fixed to said connecting member elongate edge and spaced over the length thereof, at least two slot means on said post side for receiving said tab means respectively such that longitudinal movement of said edge relative to said post side is required for detaching said connecting member from said post, means for laterally locating the position of said connecting member relative to said post side, at least two slot means on said beam side for receiving said tab means respectively such that longitudinal movement of said edge relative to said beam side is required for detaching said connecting member from said beam, means for laterally locating the position of said connecting member relative to said beam side, aperture means in each of said post side and said beam side, a pin, means for spring-biasing said pin in said connecting member to protrude outwardly of said elongate edge for engaging a respective aperture means for preventing longitudinal movement of said edge relative to the respective one of said post and said beam when said tab means engage said respective slot means for attaching said connecting member to either of said post and said beam whereby said pin when released is urged by said spring-biasing means to engage the aperture means when said tabs engage the respective slots and said pin is aligned with the aperture means, said pin being movable to a position for disengagement from said respective aperture means whereby said edge is movable longitudinally relative to said one of said post and said beam for detaching said connecting member from said one of said post and said beam, and means for attaching said connecting member to said other structural element whereby the connecting member is interchangeably connectable to either a post or a beam.

12. A modular structure kit according to claim 11 wherein said post is hollow and said post slot means extend through said post side for receiving said tab means.

13. A modular structure kit according to claim 11 wherein each of said tab means includes a body portion attached to said edge and extending outwardly therefrom and a portion depending from said body portion generally parallel to said edge, each of said beam slot means includes an elongate portion which defines a groove between said elongate portion and said beam side for receiving said respective tab means depending portion, and said lateral position locating means comprises notch means in said respective slot means elongate portion for receiving said respective tab means body portion.

14. A modular structure kit according to claim 13 wherein said post is hollow and said post slot means extend through said post side for receiving said tab means.

15. A modular structure kit comprising at least one post having a side, at least one beam having a side, at least one other structural element, and at least one connecting member having an elongate edge, at least two tab means fixed to said connecting member elongate edge and spaced over the length thereof, at least two slot means on said post side for receiving said tab means respectively such that longitudinal movement of said edge relative to said post side is required for detaching said connecting member from said post, means for laterally locating the position of said connecting member relative to said post side, at least two slot means on said beam side for receiving said tab means respectively such that longitudinal movement of said edge relative to said beam side is required for detaching said connecting member from said beam, means for laterally locating the position of said connecting member relative to said beam side, aperture means in each of said post side and said beam side, a pin, means for spring-biasing said pin in said connecting member to protrude outwardly of said elongate edge for engaging a respective aperture means for preventing longitudinal movement of said edge relative to the respective one of said post and said beam when said tab means engage said respective slot means for attaching said connecting member to either of said post and said beam, said pin being movable to a position for disengagement from said respective aperture means whereby said edge is movable longitudinally relative to said one of said post and said beam for detaching said connecting member from said one of said post and said beam, and means for attaching said connecting member to said other structural element whereby the connecting member is interchangeably connectable to either a post or a beam, the kit further comprising a kingpost having a plurality of flanges each having an outer edge portion, at least one structural member attached to one of said flanges, at least one decorative body having a pair of side walls and a pair of edge walls, inlet means in one of said edge walls receiving one of said flanges to the interior of said body so that said outer edge portion thereof engages the inner surface of the other of said edge walls, means on the interior surface of said other edge wall for locating the position of said flange, a pair of groove means in said flange on opposite sides thereof, flexibly biased means on the interior surfaces of said side walls respectively for removably engaging said groove means respectively for attaching the decorative body to the another kingpost flange.

* * * * *